United States Patent [19]

Hindermann et al.

[11] 4,049,656
[45] Sept. 20, 1977

[54] FIBRE-REACTIVE ANTHRAQUINONE DYESTUFFS

[75] Inventors: Peter Hindermann, Bottmingen; Hubert Meindl, Riehen, both of Switzerland

[73] Assignee: Ciba-Geigy AG, Basel, Switzerland

[21] Appl. No.: 593,534

[22] Filed: July 7, 1975

Related U.S. Application Data

[63] Continuation of Ser. No. 452,515, March 19, 1974, abandoned, which is a continuation of Ser. No. 269,889, July 7, 1972, abandoned, which is a continuation of Ser. No. 862,013, Sept. 29, 1969, abandoned.

[30] Foreign Application Priority Data

Oct. 3, 1968 Switzerland .................. 14805/68

[51] Int. Cl.² ............................................. C07D 239/24
[52] U.S. Cl. .................... 260/256.5 R; 260/250 A;
260/250 P; 260/250 Q; 260/251 Q; 260/304 R;
260/307 D; 260/351; 260/346.74; 544/189
[58] Field of Search ................................ 260/256.5 R

[56] References Cited

U.S. PATENT DOCUMENTS 3,301,843   1/1967   Dussey et al. ................... 260/146
3,532,690   10/1970  Eckersuey et al. ............. 260/239.75

*Primary Examiner*—Leonard Schenkman
*Attorney, Agent, or Firm*—Wenderoth, Lind & Ponack

[57] ABSTRACT

Fibre-reactive anthraquinone dyestuffs are disclosed which are of the formula

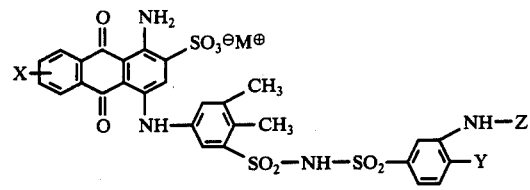

wherein
- X and Y represent independently of each other hydrogen or $SO_3^-M^+$,
- Z represents a fibre-reactive radical bound to -NH- directly or via a bridging member selected from carbonyl, sulphonyl or carbonylimino; and forming with the substrate especially polyamide or cellulose at least one covalent bond, and
- $M^+$ represents one equivalent of a colorless cation.

These dyestuffs are useful for the pad-dyeing and printing of organic materials, especially materials made from polyamide or cellulose.

The resulting dyeings are distinguished by excellent fastness to wet processing such as, in particular to washing, water, perspiration, alkali and rubbing, as well as by a good fastness to light.

5 Claims, No Drawings

FIBRE-REACTIVE ANTHRAQUINONE DYESTUFFS

This is a continuation of application Ser. No. 452,515, filed Mar. 19, 1974 (now abandoned), which application is a continuation of application Ser. No. 269,889, filed July 7, 1972 (now abandoned), which application is in turn a continuation of application Ser. No. 862,013, filed Sept. 29, 1969 (now abandoned).

DESCRIPTION OF THE INVENTION

The present invention relates to new, fibre-reactive anthraquinone dyestuffs, processes for the production of these dyestuffs, their application for the dyeing and printing of textile material, especially that made from natural or regenerated cellulose or polyamide and, as an industrial product, the textile material dyed and printed using the new dyestuffs.

The new fibre-reactive anthraquinone dyestuffs correspond to the general Formula I

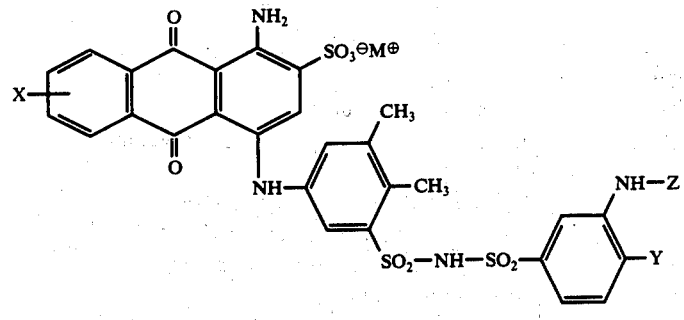

(I)

wherein
X and Y represent independently of each other hydrogen or $SO_3^-M^+$ wherein
$M^+$ represents one equivalent of a colorless cation, and
Z represents a fibre reactive grouping forming with the substrate at least one covalent bond.

The reactive radical Z, which forms with the substrate at least one covalent bond, is bound to the substituent —NH— of the dyestuff either directly or via a bridging member selected from carbonyl, sulphonyl or carbonylimino, wherein the imino hydrogen is substituted by lower alkyl.

Examples of such reactive groups are: the radical of an acid having at least one mobile halogen atom and/or a multiple bond capable of addition, e.g. the chloro or bromoacetic acid, β-chloro and β-bromopropionic acid, α,β-dibromopropionic acid, tetrahalogen cyclobutanecarboxylic acid such as 2-chloro-2-fluoro-3,3-difluoro or 2,2,3,3-tetrafluorocyclobutane-1-carboxylic acid, propiolic acid, chloropropiolic acid, acrylic acid, methacrylic acid, α-chloro, β-chloro, α-bromo and β-bromoacrylic acid, α,β- and β,β-dichloro or α,β- and β,β-dibromoacrylic acid, 2-(2,2,3,3-tetrafluorocyclobutyl-1)-acrylic acid, crotonic acid, α- or β-chloro or α- or β-bromocrotonic acid, α,β-dichlorocrotonic acid, maleic acid, monochloro or monobromomaleic acid, dichloro and dibromomaleic acid, fumaric acid, monochloro and monobromofumaric acid, dichloro and dibromofumaric acid, fumaric acid monoester, dichloro and dibromosuccinic acid, vinylsulphonic acid, β-chlorovinylsulphonic acid or a m-nitrohalogen benzoic acid or nitrohalogen benzenesulphonic acid having a mobile halogen atom, particularly with fluorine or chlorine in o- or p-position to the nitro group, such as the radical of the 3-nitro-4-fluorobenzoic acid or 3-nitro-4-fluorobenzenesulphonic acid; also with strong acids such as hydrochloric acid, sulphuric acid or alkylsulphuric acid, esterified β-hydroxyalkylsulphonyl or β-hydroxyalkylcarbonyl groups such as the β-halogen ethylsulphonyl, β-sulphatoethylsulphonyl or the β-sulphatopropionyl group, the β-alkyl or β-phenylsulphonyl-alkyl-sulphonyl or -carbonyl group, e.g. the β-phenylsulphonylpropionyl group. Preferably, the reactive group consists of the radical of an aromatic nitrogen heterocycle having advantageously more than one hetero atom in the ring which has at least one mobile halogen atom such as fluorine, chlorine or bromine, or an acryloyl, N-hydroxymethyleneamino, sulphonic acid or alkylsulphonyl group on a ring carbon atom.

Examples of such reactive esters are: the triazinyl or diazinyl radical having at least one mobile halogen atom, e.g. the radical of cyanuric chloride, cyanuric bromide or their primary condensation products, wherein a halogen atom is replaced by the optionally further substituted radical of a primary or secondary aliphatic, alicyclic, aromatic or heterocyclic amine, especially by aniline or its sulphonic acid or carboxylic acid derivatives, by lower mono and dialkylamines, as well as by ammonia, or by the radical of an aliphatic, alicyclic, aromatic or heterocyclic hydroxy or thiol compound; or the di- or trihalogen pyrimidyl radical such as the 2,4-dichloro, 2,4-dibromo, 2,4-difluoro or, in particular 2,4,5-trichloro, 2,4,5-tribromo or 2,4,5-trifluoropyrimidyl radical, the 5-bromo or 5-chloro-2,4-difluoro or 5-bromo-2,4-dichloropyrimidyl-6-radical and the 2-alkylsulphonylpyrimidyl radical, such as the 2-methylsulphonyl-4-methylpyrimidyl-6-radical. The dihalogen pyrimidyl radical can carry in the 5-position, e.g. the following substituents: methyl, ethyl, sulphonic acid amide or carboxylic acid amide optionally substituted at the nitrogen atom, carboxylic acid methyl or ethyl ester, acyl, e.g. benzoyl, alkenyl, e.g. allyl, chlorovinyl, substituted alkyl, e.g. carboxymethyl, chloro or bromomethyl, the cyano or nitro group, as well as the sulphonic acid group.

Further suitable reactive groups are, e.g. the radical of a dihalogen pyrimidinecarboxylic acid, of a 2-alkylsulphonyl-4-halogen pyrimidinecarboxylic acid, the radical of an N-(mono-halogen-bis-loweralkylamino-s-triazinyl)-carbamic acid such as the N-methyl-N-(2-chloro-4-dimethylamino-s-triazinyl-6-), the N-ethyl-N-(2-chloro-4-ethylamino-s-triazinyl-6-), the N-ethyl-N-(2-bromo-4-dimethylamino-s-triazinyl) or the N-ethyl-N-(2-fluoro-4-diethylamino-s-triazinyl)-carbamic acid or a N-(2-halogeno-4-alkoxy-6-loweralkylamino-s- triazine)-carbamic acid, such as the N-(2-chloro-4-methoxy-6-ethylamino-s-triazine)-carbamic acid, the 2,3-halogen or 2-methylsulphonylbenzothiazole or -oxazole carboxylic acid or -sulphonic acid, the 1,4-dihalogen phthalazine-6-carboxylic acid, the 2,4-dihalogen quinazoline-6- or -7- carboxylic acid or the 4,5-dihalogen-6-pyridazon-1-yl-alkylene or -phenylene carboxylic acid, as well as the acid radicals of the 2-methyl-sulphonyl-4-chloro-pyrimidine-5- or -6-carboxylic acid, 2-ethylsulphonyl-4-chloro-pyrimidine-5- or -6-carboxylic acid, 2,4-difluoro or 2,4-dichloropyrimidine-5- or -6-carboxylic acid, 2,4-dichloro-6-chloromethylpyrimidine-5-carboxylic acid, 2,3difluoro or 2,3-dichloroquinoxaline-6-carboxylic acid or -6-sulphonic acid, 2-chlorobenzothiazole or -oxazole-5- or -6-carboxylic acid or -5- or -6-sulphonic acid, 1,4-difluoro, 1,4-dichloro or 1,4-dibromophthalazine-6-carboxylic acid or -6-sulphonic acid, 2,4-dichloroquinazoline-6- or -7-carboxylic acid, 4,5-dichloro-6-pyridazon-1-yl-trimethylene carboxylic acid or -1',4'-phenylene carboxylic acid.

Mentioned as further reactive groups are: trichloropyridazinyl, dichloro-1,2,4-triazinyl, 3-chloropyridazine-6-carboxylic acid, 5-chloro-1,2,4-thiadiazol-3-yl-1',4'-phenylene carboxylic acid, allylsulphone and allylsulphide radicals. Mention can also be made of the reactive radical Z having, e.g. instead of a reactive halogen atom or an ester group, a reactive ammonium, quinuclidinium, pyridinium, hydrazinium or sulphonium radical or the sulphonic acid group.

In the preferred fibre-reactive anthraquinone- dyestuffs of the Formula I,

Z represents
a. a radical of one of the formulas:

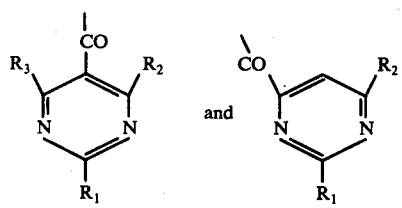

wherein
$R_1$ represents halogen or lower alkylsulfonyl;
$R_2$ represents halogen;
$R_3$ represents hydrogen or halogeno-loweralkyl;
b. a radical of the formula:

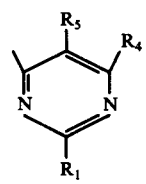

wherein
$R_4$ represents halogen or lower alkyl, and
$R_5$ represents hydrogen, halogen, cyano, lower alkyl, nitro, sulfamoyl, carbamoyl, N-mono or N,N-di-lower alkyl substituted sulfamoyl or carbamoyl; lower alkoxy carbonyl; sulphonic acid group;
c. a radical of the formula:

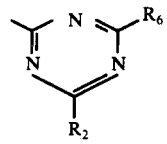

wherein
$R_6$ represents halogen, amino, mono lower alkyl amino, di-lower alkyl amino or phenylamino, sulphophenylamino, di-sulphophenylamino or carboxyphenylamino.
d. a radical of the formula

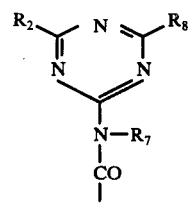

wherein
$R_7$ represents lower alkyl,
$R_8$ represents lower alkoxy, mono lower alkylamino or di-lower alkylamino;
e. 2,3-dihalogeno-quinoxaline-6-carbonyl;
f. 2,3-dihalogeno-quinoxaline-6-sulfonyl;
g. 1,4-dihalogeno-phthalazine-6-carbonyl;
h. 1,4-dihalogeno-phthalazine-6-sulfonyl;
i. 2,4-dihalogen-quinazoline-6- or -7-carbonyl;
k. 4,5-dihalogeno-6-pyridazonyl-1-alkanoyl;
l. 4,5-dihalogeno-6-pyridazonyl-1-phenylene carbonyl;
m. a radical of the formula

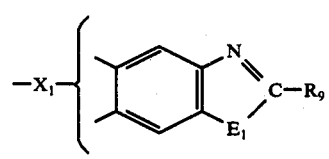

wherein
$E_1$ represents —O— or —S—,
$X_1$ represents —CO— or —SO$_2$—, and
$R_9$ represents halogen, lower alkyl sulfonyl or the sulphonic acid group;
n. a radical of the formula

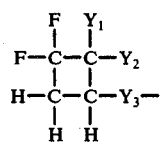

wherein
$Y_1$ and $Y_2$ represents independently of each other chlorine or fluorine, and
$Y_3$ represents —CO— or —CH=CH—CO—;
o. a radical of the formula

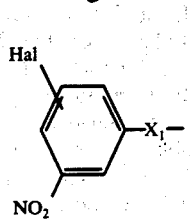

wherein
X₁ represents —CO— or —SO₂— and
Hal represents halogen in o- or p-position to NO₂;
p. a radical of the formula

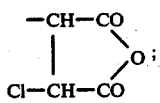

q. α- or β-halogenoalkanoyl;
r. α,β-dihalogenoalkanoyl;
s. alkenoyl;
t. α- or β-halogeno-alkenoyl;
u. α,β-dihalogenoalkenoyl;
v. alkinoyl;
w. halogenoalkinoyl;
x. vinylsulfonyl; and
y. halogenovinylsulfonyl.

In most preferred dyestuffs Z is a radical selected from said (a) to (d) and (q) to (u) groups and especially it represents the radical of cyanuric chloride, N-ethyl-N-(2-chloro-4-methoxy-s-triazinyl-6)-carbamic acid chloride, 2,4,6-trifluoro-5-chloropyrimidine, 2,4-dichloropyrimidine-5- or -6-carboxylic acid chloride, or the radical of β-bromoacrylic acid chloride, β-chlorocrotonic acid chloride or α,β-dibromopropionic acid chloride.

The new fibre-reactive anthraquinone dyestuffs of the general Formula I are obtained, e.g. by reacting an aminoanthraquinone dyestuff of the general formula II, 1-amino-4-[3',4'-dimethyl-5'-(3''-aminophenyl-1'')-disulfimido]-phenylamino-anthraquinone-2-sulphonic acid;
1-amino-4-[3',4'-dimethyl-5'-(3''-aminophenyl-1'')-disulfimido]-phenylamino-anthraquinone-2,6- and 2,7-disulphonic acid;
1-amino-4-[3',4'-dimethyl-5'-(3''-aminophenyl-1'')-disulfimido]-phenylamino-anthraquinone-2,4''-disulphonic acid;
1-amino-4-[3',4'-dimethyl-5'-(3''-aminophenyl-1'')-disulfimido]-phenylamino-anthraquinone-2,6,4''-trisulphonic acid;

as well as a mixture of 1-amino-4-[3',4'-dimethyl-5'-(3''-aminophenyl-1'')-disulfimido]-phenylamino-anthraquinone-2,5 and 2,8 or 2,6 and 2,7-disulphonic acid; or
1-amino-4-[3',4'-dimethyl-5'-(3''-aminophenyl-1'')-disulfimido]-phenylamino-anthraquinone-2,5,4'' and 2,8,4''-trisulphonic acid.

Suitable compounds introducing the reactive radical Z are accordingly those initially mentioned under Z; if carboxylic and sulphonic acids are concerned, the chlorides or anhydrides of these are advantageously used.

The reaction of the aminoanthraquinone dyestuffs of the Formula II with a compound introducing the reactive radical Z is performed in the usual manner, advantageously in aqueous medium, optionally in the presence of inert, easily-removable, organic solvents such as lower aliphatic ketones, e.g. acetone, and preferably in the presence of mineral-acid-buffering agents such as sodium or potassium carbonate, sodium or potassium hydroxide, di- or trisodium or di- or tripotassium phosphate, or sodium or potassium acetate.

After completion of the reaction, the finished fibre-reactive anthraquinone dyestuff of the Formula I is salted out with sodium chloride or potassium chloride from its, advantageously previously neutralised, solu- (II)

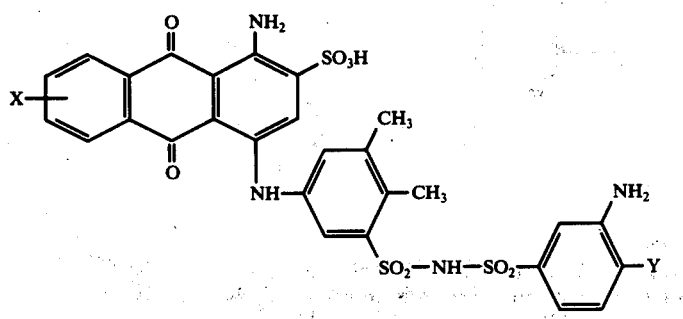

wherein X and Y have the meaning given in Formula I, with a compound introducing the reactive radical Z, whereby the latter can form with the substrate at least one covalent bond, to obtain a fibre-reactive anthraquinone dyestuff of the general Formula I.

The starting materials of the Formula II, which are new, and also the production thereof are described in U.S. Patent application Ser. No. 860,042, filed Sept. 22, 1969 now U.S. Pat. No. 3,673,221.

The following compounds of the Formula II have thereby proved to be especially suitable for the present process:

tion or suspension, filtered with suction, washed and dried. The new fibre-reactive anthraquinone dyestuffs are advantageously dried with a moderate heat and, optionally, under reduced pressure.

The new fibre-reactive anthraquinone dyestuffs are dark powders which, in the form of their alkali salts, are easily soluble in water. They are suitable for the dyeing and printing of textile material, especially that made from natural or regenerated cellulose fibres such as rayon staple, jute, linen, ramie, hemp and, in particular, cotton, in pure brilliant blue shades.

These materials are dyed with the reactive dyestuffs, obtainable according to the invention, using known methods. The cellulose material is impregnated or printed at a lower temperature, e.g. at 20°–50° C, with the optionally thickened dyestuff solution and the dyestuff is then fixed by treatment with acid-binding agents. Suitable as such are, e.g. sodium carbonate, potassium carbonate, di- and tri-sodium phosphate, sodium hydroxide solution and, at temperatures above 50° C, also potassium or sodium bicarbonate. Instead of subjecting the impregnated materials to an alkaline aftertreatment, the acid-binding agent can in many cases be added, preferably in the form of alkali carbonates, to the impregnating liquors or printing pastes and the production of the dyeing then effected by a short heating or steaming to temperatures between 100° C and 160° C, or by a longish standing time at room temperature. The addition of hydrotropic agents to the printing pastes and impregnating liquors is advantageous in this process, e.g. the addition of urea in amounts of 10 to 200 g per liter of dyeing agent.

Furthermore, cellulose material can be dyed, with dyestuffs according to the invention, also using the exhaustion process by introducing the cellulose to be dyed into the dye bath containing an acid-binding agent and, optionally, also neutral salts such as, e.g. sodium chloride or sodium sulphate, dyeing being performed in a long dye liquor and at slightly elevated temperature. The dye bath is gradually heated to temperatures of 40 to 100° C and the dyeing process completed at this temperature. The neutral salts, accelerating the extraction of the dyestuff, can be added to the dye bath optionally also after the actual dyeing temperature has been attained.

By the treatment with acid-binding agents, the new dyestuffs are chemically fixed to the fibre. After soaping for the purpose of removing non-fixed dyestuff, the cellulose dyeings have excellent fastness to wet-processing such as, in particular, to washing, water perspiration, alkali and rubbing, as well as a good fastness to light.

Non-fixed dyestuff can be very easily and completely washed out. This property is an essential prerequisite for good wetfastness of the dyeings on cellulose fibres using reactive dyestuffs.

Moreover, with regard to the aftertreatment using agents for improving the fastness to wet-processing and/or creasing, the shade and fastness to light of the cellulose dyeings, obtained with the new dyestuffs, are only negligibly affected.

The new fibre-reactive anthraquinone dyestuffs can, however, also be used for the dyeing of polyamide-containing fibre material, e.g. natural fibre material such as wool or silk, or synthetic material such as nylon. Natural polyamide fibres are dyed in a hot, slightly acid bath, e.g. an acetic acid bath, in the presence of auxiliary agents to improve the evenness of the dyeing, such as fatty acid alkanolamine polycondensation products as well as, optionally, in the presence of salts such as sodium chloride or sulphate. Synthetic polyamide fibres are advantageously dyed in a hot acid bath, then rinsed and subsequently treated in a boiling alkaline bath.

In this specification and the appended claims, the term "lower" applied to "alkyl" or "aliphatic ketones" means such groups having 1 to 5 carbon atoms, expressly stated otherwise; "halogen or halogeno" represents fluorine, chlorine or bromine.

The following non-limitive examples illustrate the invention. The temperatures are given therein in degrees Centigrade. In each case in the dyestuff formulae, the free acid form —SO₃H is given; the dyestuffs are, however, advantageously obtained in the form of their alkali metal salts or ammonium salts.

EXAMPLE 1

65.6 g of 1-amino-4-[3',4'-dimethyl-5'-(3''-aminophenyl-1'')-disulphimido]-phenylamino-anthraquinone-2-sulphonic acid are dissolved in 1200 ml of water with a pH-value of 6–7 and at room temperature. After cooling to 0°–5°, 22.5 g of 2,4-dichloropyrimidine-5-carboxylic acid chloride are added to this solution. The pH-value of the reaction mixture is maintained at 5–6 by addition of a 10% solution of tertiary sodium-o-phosphate. As soon as the condensation reaction has finished, the dyestuff solution is heated to 20°, the pH-value adjusted to 7.0 and, by addition of 130 g of potassium chloride, the new anthraquinone reactive dyestuff is precipitated of the formula:

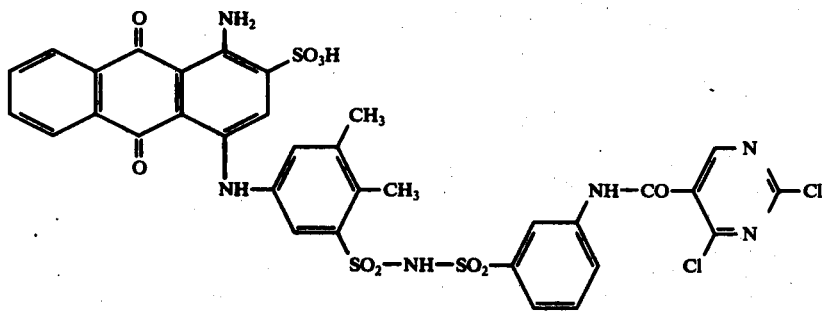

The dyestuff is filtered with suction, washed with 10% potassium chloride solution and dried at 60° in vacuo.

The 1-amino-4-[3',4'-dimethyl-5'-(3''-aminophenyl-1'')-disulphimido]-phenylamino-anthraquinone-2-sulphonic acid is obtained by dissolving 46.1 g of 3,3'-diamino-5,6-dimethyldibenzenedisulphimide in 450 ml of water at 50° with a pH-value of 7–8 and adding to this solution, 38.2 g of 1-amino-4-bromo-anthraquinone-2-sulphonic acid and 4 g of sodium bicarbonate. The reaction mixture is heated to 85°–87° and to the solution is added in portions and within one hour, a mixture of 0.5 g of copper powder and 20 g of sodium bicarbonate. The reaction is completed during 4 hours at 80°–85°, the dyestuff solution separated from the undissolved materials by filtration and the dyestuff of the formula

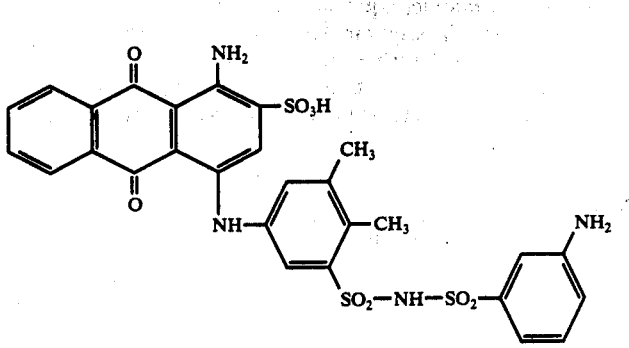

is precipitated with 32 g of sodium chloride. It is filtered and subsequently washed with 5% sodium chloride solution.

If cotton is padded with a solution, consisting of 20 g of the reactive dyestuff according to Example 1, and 20 g of sodium bicarbonate in 1000 ml of water, dried and thereupon exposed for 2 minutes to a dry heat of 140°, then a very pure, blue dyeing is obtained which, after soaping, exhibits a very good fastness to wet processing and to light.

EXAMPLE 2

65.6 g of 1-amino-4-[3',4'-dimethyl-5'-(3''-aminophenyl-1'')-disulphimido]-phenylamino-anthraquinone-2-sulphonic acid are dissolved in 1200 ml of water with a pH-value of 6–7 and at room temperature. After cooling to 0°–5°, 19.5 g of cyanuric chloride are added to this solution. The pH-value of the reaction mixture is maintaned at 5–6 by addition of a 10% solution of tertiary sodium-o-phosphate. As soon as the condensation reaction has finished, the dyestuff solution is heated to 40°, the pH-value adjusted to 7.0 and, by addition of 130 g of potassium chloride, the new anthraquinone reactive dyestuff is precipitated of the formula:

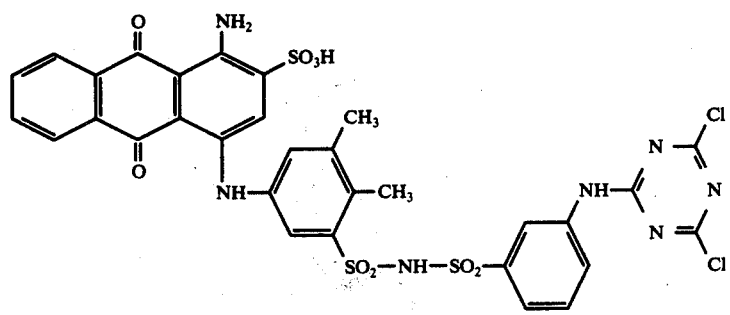

The dyestuff is filtered with suction, washed with 10% potassium chloride solution and dried at 60° in vacuo.

If cotton is padded with a solution, consisting of 20 g of the reactive dyestuff according to Example 2, and 20 g of sodium bicarbonate in 1000 ml of water, dried and thereupon exposed for 5 minutes to a dry heat of 140°, then a very pure, blue dyeing is obtained which, after soaping, exhibits a very good fastness to wet processing and to light.

EXAMPLE 3

65.6 g of the dyestuff 1-amino-4-[3',4'-dimethyl-5'-(3''-aminophenyl-1'')-disulphimido]-phenylamino-anthraquinone-2-sulphonic acid, according to Example 1, are dissolved in 1200 ml of water with a pH-value of 6–7. To this solution are added dropwise, at a temperature of 5°–10°, 20.7 g of 2,4,6-trifluoro-5-chloropyrimidine and the pH-value is maintained at 6–7 by the dropwise addition of 10% sodium carbonate solution. The obtained reactive dyestuff of the formula

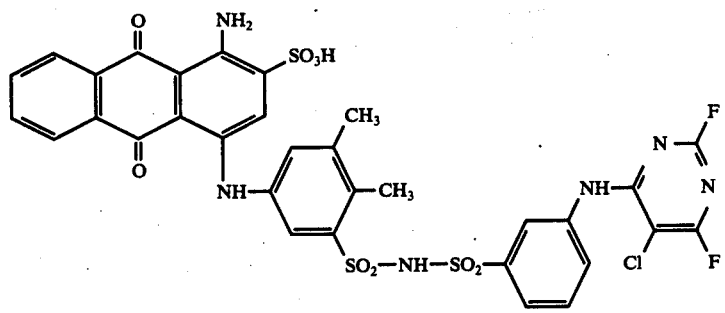

precipitates from the reaction mixture and, after completion of the reaction, is filtered off, washed with 3% sodium chloride solution and dried at 50° in vacuo.

If wool fabric is treated with a 2% aqueous solution of the dyestuff of the above formula, which also contains 2.4% of acetic acid, during 15 minutes at 80°, then a strong blue dyeing is obtained having a good fastness to light and a very good fastness to wet processing.

If instead of the 1-amino-4-[3′,4′-dimethyl-5′-(3″-aminophenyl-1″)-disulphimido]-phenylamino-anthraquinone-2-sulphonic acid according to Example 3 equivalent amounts of the aminoanthraquinone dyestuffs listed in Table I, Column II, or of the stated mixtures are used, and in place of the 2,4,6-trifluoro-5-chloropyrimidine, equivalent amounts of the acylating agent given in Column III, with otherwise the same procedure as described in Example 3 at temperatures given in Column IV, then reactive blue anthraquinone dyestuffs are obtained having similarly valuable properties.

TABLE I

| I Ex. ample No. | II X | II Y | III Acylating agent | IV Temperature in °C |
|---|---|---|---|---|
| 4 | H | H | Cl—CO—CHBr—CH$_2$—Br | 5–10 |
| 5 | H | H | ClCO—CH=CHBr | 5–10 |
| 6 | H | H | ClCO—CH$_2$Cl | 5–10 |
| 7 | 7-SO$_3$H | H | Cl—CO—CH=CCl—CH$_3$ | 5–10 |
| 8 | H | H | ClCO—CH=C(Cl)—CH$_3$ | 5–10 |
| 9 | 6-SO$_3$H | H | 5-chloro-2,4,6-trifluoropyrimidine | 5–10 |
| 10 | H | H | dichloropyrimidine carbonyl chloride | 5–10 |
| 11 | 5/8-SO$_3$H(mixture) | SO$_3$H | chloro-methylsulphonyl-pyrimidine carbonyl chloride | 5–10 |
| 12 | 5/8-SO$_3$H(mixture) | H | Cl—CO—C≡CCl | 5–10 |
| 13 | H | H | Cl—CO—CH=CH$_2$ | 5–10 |
| 14 | 6-SO$_3$H | H | Br—CO—CHBr—CH$_2$—Br | 5–10 |
| 15 | H | H | chloro-methoxy-triazinyl-N(ethyl)carbamoyl chloride | 5–10 |
| 16 | 7-SO$_3$H | H | fluoro-diethylamino-triazinyl-N(ethyl)carbamoyl chloride | 0–5 |
| 17 | 7-SO$_3$H | H | 5-chloro-2,4,6-trifluoropyrimidine | 15–20 |

TABLE I-continued

| Example No. | X | Y | Acylating agent | Temperature in °C |
|---|---|---|---|---|
| 18 | 6/7-SO$_3$H(mixture) | H | (5-chloro-2,4,6-trifluoropyrimidine) | 15-20 |
| 19 | H | H | (2,3-dichloroquinoxaline-6-carbonyl chloride) | 5-10 |
| 20 | H | H | (chloro-triazine derivative with N(C$_2$H$_5$)$_2$ and Cl-CO-N(CH$_3$)-) | 0-5 |
| 21 | 5/8-SO$_3$H(mixture) | H | (4,5-dichloro-6-oxo-pyridazinyl-propionyl chloride) | 5-10 |
| 22 | 7-SO$_3$H | H | (2,2,3,3-tetrafluorocyclobutane-1-carbonyl chloride) | 5-10 |
| 23 | 6-SO$_3$H | H | (chloro-triazine with NH-C$_2$H$_5$ and Cl-CO-N(C$_2$H$_5$)-) | 10-15 |
| 24 | H | H | (fluoro-triazine with N(CH$_3$)$_2$ and Cl-CO-N(CH$_3$)-) | 5-10 |
| 25 | 6-SO$_3$H | H | (fluoro-triazine with N(CH$_3$)$_2$ and Cl-CO-N(CH$_3$)-) | 5-10 |
| 26 | 7-SO$_3$H | H | (bromo-triazine with N(C$_2$H$_5$)$_2$ and Br-CO-N(C$_2$H$_5$)-) | 10-15 |

TABLE I-continued

| | I | II | | III | IV |
|---|---|---|---|---|---|
| Example No. | X | Y | | Acylating agent | Temperature in °C |
| 27 | 7-SO$_3$H | H | | Cl—CO—[pyrimidine with Cl, N, N, SO$_2$—C$_2$H$_5$] | 0–5 |
| 28 | 6-SO$_3$H | H | | Cl—CO—[pyrimidine with Cl, N, N, Cl] | 5–10 |

Structure for Table (column II): 1-amino-4-(NH-aryl)-anthraquinone-2-sulphonic acid with X substituent at position 5, CH$_3$, CH$_3$ groups, and SO$_2$—NH—SO$_2$—aryl-NH$_2$-Y bridge.

EXAMPLE 29

73.6 g of 1-amino-4-[3',4'-dimethyl-5'-(3''-aminophenyl-1'')-disulphimido]-phenylamino-anthraquinone-2,6-disulphonic acid (produced from 1-amino-4-bromoanthraquinone-2,6-disulphonic acid and 3,3'-diamino-5,6-dimethyldibenzene-disulphimide analogously to the data in Example 1) are dissolved in 1300 ml of water and to the solution are added 22.9 g of tetrachloropyrimidine at 80°–85°. The reaction mixture is stirred at 80°–85° until the reaction is completed. The pH-value is maintained at 6–7 by the addition of 20% sodium carbonate solution. As soon as the reaction is completed, the dyestuff solution is filtered and the dyestuff then precipitated by the addition of 230 g of solid sodium chloride. The dyestuff is filtered off, subsequently washed with 20% sodium chloride solution and dried in vacuo at 80°. It corresponds to the formula:

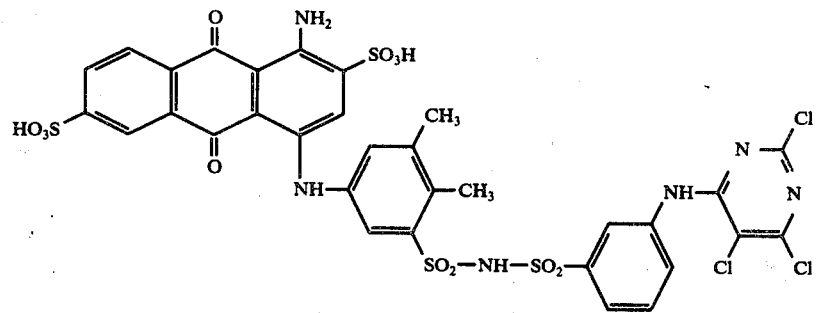

If, instead of 1-amino-4-[3',4'-dimethyl-5'-(3''-aminophenyl-1'')-disulphimido]-phenylamino-anthraquinone-2,6-disulphonic acid, equivalent amounts are used of the aminoanthraquinone dyestuffs, given in Table II, Column II, or of the stated mixtures and, instead of tetrachloropyrimidine, the acylating agents given in Column III, the procedure being otherwise as described in the example and at temperatures given in Column IV then similarly valuable blue reactive anthraquinone dyestuffs are obtained.

TABLE II

| Example No. | X | Y | Acylating Agent | Temperature in °C |
|---|---|---|---|---|
| 30 | 5/8-SO₃H(mixture) | H | 2,4,5,6-tetrachloropyrimidine | 80–90 |
| 31 | 7-SO₃H | H | 2,4,6-trichloropyrimidine | 80–90 |
| 32 | 5/8-SO₃H(mixture) | H | 2,4,5,6-tetrabromopyrimidine | 80–90 |
| 33 | H | H | 2,4-dichloro-6-(3-sulfophenylamino)-1,3,5-triazine | 30–40 |
| 34 | 6-SO₃H | H | 2,4-dichloro-6-amino-1,3,5-triazine | 30–40 |

Structure heading (formula I with X at position 5, substituents as shown): 1-amino-4-[dimethylphenyl-disulphimido-aminophenyl]-anthraquinone-sulphonic acid derivative with acylating agent attached at NH₂ via Y.

EXAMPLE 35

32.8 g of 1-amino-4-[3′,4′-dimethyl-5′-(3″-aminophenyl-1″)-disulphimido]-phenylamino-anthraquinone-2,4″-disulphonic acid are dissolved in 450 ml of water at 30° and having a pH-value of 8.5–9.0. The pH-value is adjusted to 3.0 by the addition of 10% hydrochloric acid and the solution is cooled to +3°, whereby a solution of 11.6 g of 2,4-dichloropyrimidine-5-carboxylic acid chloride dissolved in 40 ml of acetone is added dropwise within 5 minutes. The pH-value is maintained at 2.0–3.0 by the addition of 10% sodium hydroxide solution. The temperature being between 0° and 5°. As soon as the reaction is completed, the pH-value of the reaction mixture is adjusted to 7.0 and the partially already precipitated reactive dyestuff of the formula

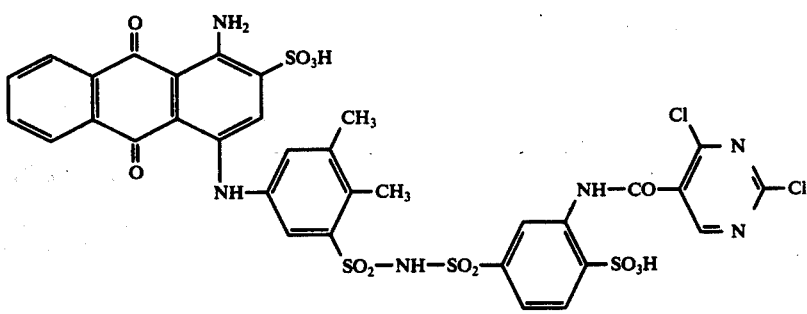

is salted out by the addition of 70 g of solid sodium chloride filtered off and subsequently washed with 15% sodium chloride solution. Drying is performed at 50°-60° in vacuo. The dyestuff dissolves in water to give a blue colour and dyes cotton, according to the process given in Example 1, in very pure blue shades. The thus obtained dyeing exhibits after soaping an excellent fastness to wet-processing and to light.

If instead of the 1-amino-4-[3',4'-dimethyl-5'-(3''-aminophenyl-1'')-disulphimido]-phenylamino-anthraquinone-2,4''-disulphonic acid, equivalent amounts of the aminoanthraquinone dyestuffs are used which are listed in Table III, Column II, or of the stated mixtures and, instead of 2,4-dichloropyrimidine-5-carboxylic acid chloride, equivalent amounts are used of the acylating agents given in Column III, the procedure being otherwise as described in the example and at temperatures given in Column IV then blue, reactive anthraquinone dyestuffs are obtained having similarly valuable properties.

Table III

| Ex. ample No. | X | Y | Acylating agent | Temperature in °C |
|---|---|---|---|---|
| 36 | H | SO$_3$H | H$_2$C(Br)—CH(Br)—COCl | 5-10 |
| 37 | 5/8-SO$_3$H(mixture) | H | 2,4,6-trichloro-1,3,5-triazine | 5-10 |
| 38 | 6-SO$_3$H | H | tetrafluoro-cyclobutane-COCl | 5-10 |
| 39 | H | H | 2,4,6-trifluoropyrimidine | 15-20 |
| 40 | H | H | 5-bromo-2,4,6-trifluoropyrimidine | 10-15 |
| 41 | H | SO$_3$H | BrHC=CH—COCl | 5-10 |
| 42 | 5/8-SO$_3$H(mixture) | H | 2,4,6-trichloropyrimidine-5-COCl | 5-10 |
| 43 | 6-SO$_3$H | H | 2,4,6-trichloropyrimidine-5-COCl | 5-10 |

Column II structure: 1-amino-anthraquinone with 2-SO$_3$H, 4-NH—(3,4-dimethyl-phenyl with SO$_2$—NH—SO$_2$—phenyl(NH$_2$)(Y)), X at position 5/6/8.

Table III-continued

| I Example No. | II X | III Y | Acylating agent | IV Temperature in °C |
|---|---|---|---|---|
| 44 | 6-SO$_3$H | SO$_3$H | (chloro-pyrimidine with COCl, Cl substituents and chlorovinyl group) | 5-10 |
| 45 | H | H | (bromo-pyrimidine with COBr, Br substituents and bromovinyl group) | 5-10 |
| 46 | 6-SO$_3$H | H | (pyrimidine with COCl, Cl, SO$_2$CH$_3$ substituents) | 0-5 |
| 47 | 7-SO$_3$H | H | (pyrimidine with ClCO, Cl, SO$_2$C$_2$H$_5$ substituents) | 0-5 |
| 48 | H | H | Cl—CO—N(C$_2$H$_5$)— triazine with Cl and NH—C$_2$H$_5$ | 10-15 |
| 49 | 6-SO$_3$H | H | Cl—CO—N(CH$_3$)— triazine with Cl and N(CH$_3$)$_2$ | 10-20 |
| 50 | H | H | Cl—CO—N(C$_2$H$_5$)— triazine with F and N(C$_2$H$_5$)$_2$ | 0-5 |
| 51 | H | H | Cl—CO—CH(Cl)—CH$_2$—Cl | 0-5 |

Structure at top of table:

Anthraquinone core with:
- Position 1: NH$_2$
- Position 2: SO$_3$H
- Position 4: NH— linked to dimethylbenzene ring bearing two CH$_3$ groups and —SO$_2$—NH—SO$_2$— linked to aniline ring with NH$_2$ and Y substituents
- Position 6/5: X Table III-continued

| Example No. | X | Y | Acylating agent | Temperature in °C |
|---|---|---|---|---|
| 52 | 7-SO₃H | H | (dichloroquinoxaline carbonyl chloride) | 5–10 |

EXAMPLE 53

36.8 g of a mixture of 1-amino-4-[3′,4′-dimethyl-5′-(3″-aminophenyl-1″)-disulphimido]-phenylamino-anthraquine-2,8 and -2,5-disulphonic acid are dissolved in 500 ml of water (neutral) at a temperature of 40°–45°. Into this solution are sprinked, while stirring, 17.6 g of 1-[N-2′,4′-dichloro-s-triazinyl-6′)-aminobenzene-3-sulphonic acid. During the reaction, the pH-value is maintained at 6–7 by the dropwise addition of 20% soda solution. The reaction is completed at 40°–45° and the dyestuff mixture of the formulae sium chloride solution. The dyestuff mixture is dried in vacuo at 70°. It dyes cotton, using the method described in Example 1, in pure blue shades. The dyeings are distinguished by a very good fastness to wet processing.

If, instead of the anthraquinone dyestuff mixture stated in this example, equivalent amount are used of the anthraquinone dyestuffs listed in Column II of Table IV or of the therein stated mixtures and, instead of the 1-(N-2′,4′-dichloro-s-triazinyl-6′)-aminobenzene-3-sulphonic acid, the acylating agents given in Column III are used, the procedure being otherwise as described in the example and at temperatures given in Column IV

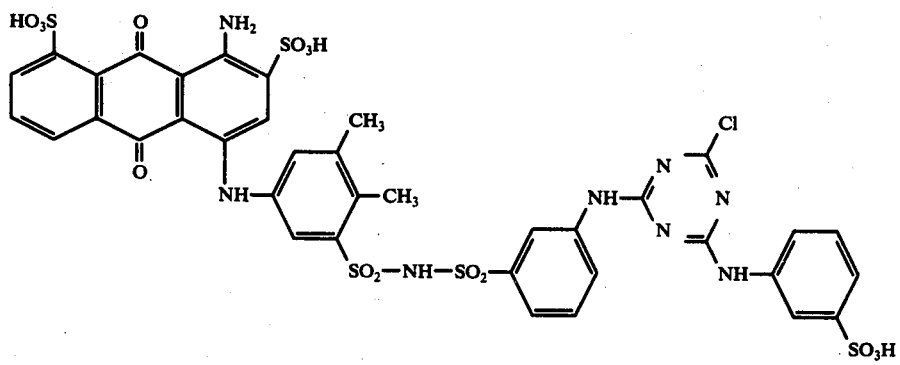

and

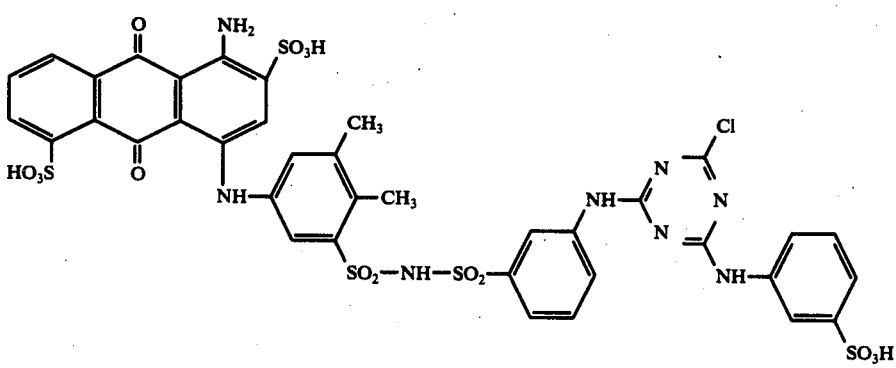

precipitated by the addition of solid potassium chloride, filtered off and subsequently washed with 20% potassium chloride then similarly valuable blue reactive anthraquinone dyestuffs are obtained.

Table IV

Structure (column II):

$$\text{X-[anthraquinone with 1-NH}_2\text{, 2-SO}_3\text{H, 4-NH-(2,6-dimethyl-phenyl)-SO}_2\text{-NH-SO}_2\text{-(3-NH}_2\text{, 4-Y-phenyl)]}$$

| Example No. | X | Y | Acylating Agent | Temperature in °C |
|---|---|---|---|---|
| 54 | 6-SO$_3$H | H | ClC(=NC(Cl)=CH$_2$)–C(CN)=C(Cl)(N=) (dichloro-cyanovinyl triazine type) | 25–35 |
| 55 | H | H | CH$_3$–C(=N–C(=CH–SO$_2$CH$_3$))–C(SO$_2$CH$_3$)=N– | 40–50 |
| 56 | 7-SO$_3$H | H | H$_2$N–C(=N)–N=C(Cl)–N=C(C(Cl)=CH$_2$)– (chloro-vinyl amino triazine) | 30–40 |
| 57 | 6-SO$_3$H | H | CH$_2$=CH–SO$_2$Cl | 20–30 |
| 58 | H | H | ClCH=CH$_2$–SO$_2$Cl | 20–30 |
| 59 | 6-SO$_3$H | H | 3-NO$_2$-4-F-C$_6$H$_3$-SO$_2$Cl | 20–30 |
| 60 | 7-SO$_3$H | H | 3-NO$_2$-4-F-C$_6$H$_3$-SO$_2$Cl | 20–30 |
| 61 | 5/3-SO$_3$H (mixture) | H | ClSO$_2$-C$_6$H$_3$(quinoxaline 2,3-dichloro) | 20–30 |
| 62 | 6-SO$_3$H | H | ClSO$_2$-C$_6$H$_3$(phthalazine 1,4-dichloro) | 20–30 |
| 63 | H | H | H$_2$N–C(=N)–N=C(Cl)–N=C(C(Cl)=CH$_2$)– | 30–40 |
| 64 | H | H | CH$_2$=CH–SO$_2$Cl | 20–30 |
| 65 | 7-SO$_3$H | H | CH$_2$=CH–SO$_2$Cl | 20–30 |
| 66 | H | H | ClCH–CO$\big\rangle$O / ClCH–CO (dichloromaleic anhydride) | 20–30 |

We claim:
1. A dyestuff of the formula

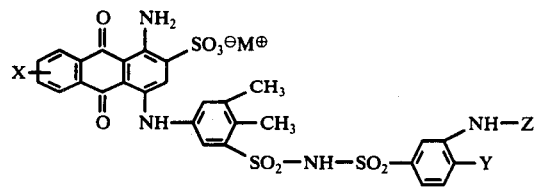

wherein
X and Y represent independently of each other hydrogen or SO₃-M+,
M+ represents hydrogen, alkali metal or ammonium, and
Z represents a radical of one of the formulas:

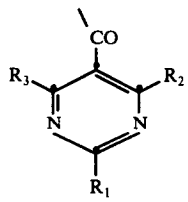 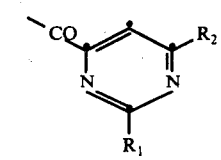

wherein
R₁ represents halogen or lower alkylsulfonyl;
R₂ represents halogen;
R₃ represents hydrogen or halogeno-loweralkyl.

2. A dyestuff as defined in claim 1 wherein Z is the radical

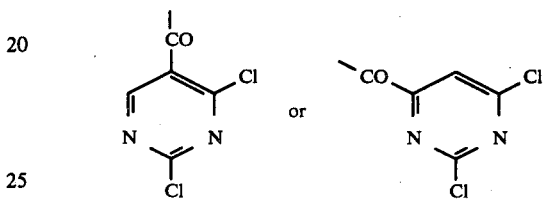

3. A dyestuff as defined in claim 1, which is of the formula

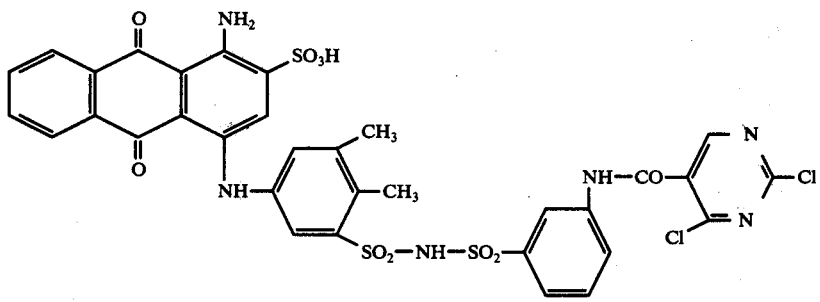

4. A dyestuff as defined in claim 1 which is of the formula

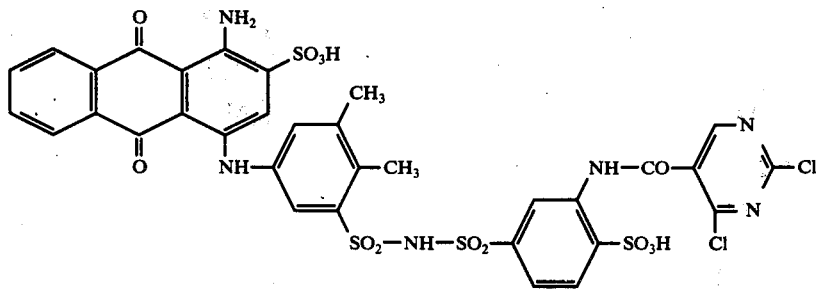

5. A dyestuff as defined in claim 1 which is of the formula

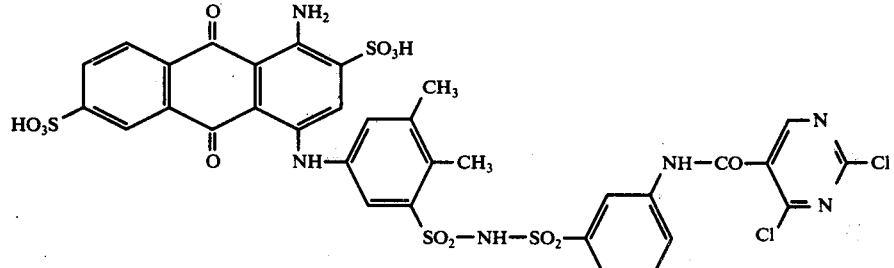

* * * * *